(12) United States Patent
Loh

(10) Patent No.: US 6,775,457 B2
(45) Date of Patent: Aug. 10, 2004

(54) DEVICE HOLDER ACCOMMODATING WAVELENGTH DIVISION MULTIPLEXERS

(75) Inventor: Frank Loh, Coupertino, CA (US)

(73) Assignee: Hon Hai Precison Ind. Co., Ltd., Taipei Hsien (TW)

( * ) Notice: Subject to any disclaimer, the term of this patent is extended or adjusted under 35 U.S.C. 154(b) by 29 days.

(21) Appl. No.: 10/167,290

(22) Filed: Jun. 10, 2002

(65) Prior Publication Data

US 2003/0228122 A1 Dec. 11, 2003

(51) Int. Cl.⁷ .................................................. G02B 6/00
(52) U.S. Cl. ........................................ 385/136; 385/137

(56) References Cited

U.S. PATENT DOCUMENTS 5,566,268 A * 10/1996 Radliff et al. ............... 385/137
5,566,269 A * 10/1996 Eberle et al. ............... 385/137
5,689,598 A * 11/1997 Dean et al. ................... 385/59
6,226,439 B1 * 5/2001 Daoud ......................... 385/137
6,240,236 B1 * 5/2001 Daoud ......................... 385/137
6,249,636 B1 * 6/2001 Daoud ......................... 385/137

* cited by examiner

*Primary Examiner*—Chandrika Prasad
(74) *Attorney, Agent, or Firm*—Wei Te Chung

(57) ABSTRACT

A device holder (10) adapted to be used in an optical module box (2) for retaining WDMs (1). The device holder is injection molded and made of a specific thermoplastic material that can help maintain a normal operating temperature of the WDMs mounted in the optical module box. The device holder comprises a mounting substrate (12), a plurality of protrusions (14) extending upwardly from the substrate, and two side mounting beams (161a) and a middle mounting beam(161b). Adjacent protrusions form mounting grooves (15) for retaining the WDMs therein. The device holder is mounted to the bottom of the optical module box by screws.

10 Claims, 3 Drawing Sheets

DEVICE HOLDER ACCOMMODATING WAVELENGTH DIVISION MULTIPLEXERS

BACKGROUND OF THE INVENTION

1. Field of the Invention

This invention relates generally to a device holder for WDMs, and more particularly to a device holder for retaining WDMs in an optical module.

2. Description of the Related Art

WDM systems are widely deployed in modem communications networks. In a WDM system, multiple channels are carried over a single optical fiber without interference between the channels, so that channel-carrying capacity is increased. A WDM system includes a WDM module that secures a plurality of WDMs therein. WDMs must be properly secured in the WDM module, to ensure their reliable and durable operation. Various means have been developed for securing WDMs.

Conventionally, the WDM module is fixed to the optical module by epoxy resin. However, epoxy resin takes a long time to solidify (generally 2 or 3 hours at a temperature of 110 degrees). Additionally, epoxy resin tends to degrade and lose strength after repeated changes in environmental conditions.

Furthermore, WDM modules are usually made of metal, which transfer heat very fast. We know that temperature can adversely affect the optical performance of a device, including the stability of the device.

It is desired to provide an improved device holder that is capable of effectively and reliably securing WDMs in an optical module.

An example of a device holder is disclosed in a co-pending patent application, U.S. Ser. No. 10/012005, filed on Nov. 30, 2001 by the same inventor, which is hereby incorporated by reference.

SUMMARY OF THE INVENTION

An object of the present invention is to provide a device holder for WDMs which can be firmly fixed to an optical module.

Another object of the present invention is to provide a device holder, which is made of a material which can help maintain a normal operating temperature of the WDMs mounted in an optical module.

In order to achieve the above objects, a device holder according to the present invention comprises a mounting substrate, a plurality of protrusions extending upwardly from the substrate, two side mounting beams and a middle mounting beam. Adjacent protrusions form grooves therebetween for retaining the WDMs therein. The device holder is mounted to a bottom of an optical module box using screws. The device holder is injection molded and is made of a specific thermoplastic material.

Other objects, advantages and novel features of the present invention will be drawn from the following detailed description of a preferred embodiment of the present invention with attached drawings, in which:

DETAIL DESCRIPTION OF THE PREFERRED EMBODIMENT

Figure 1:
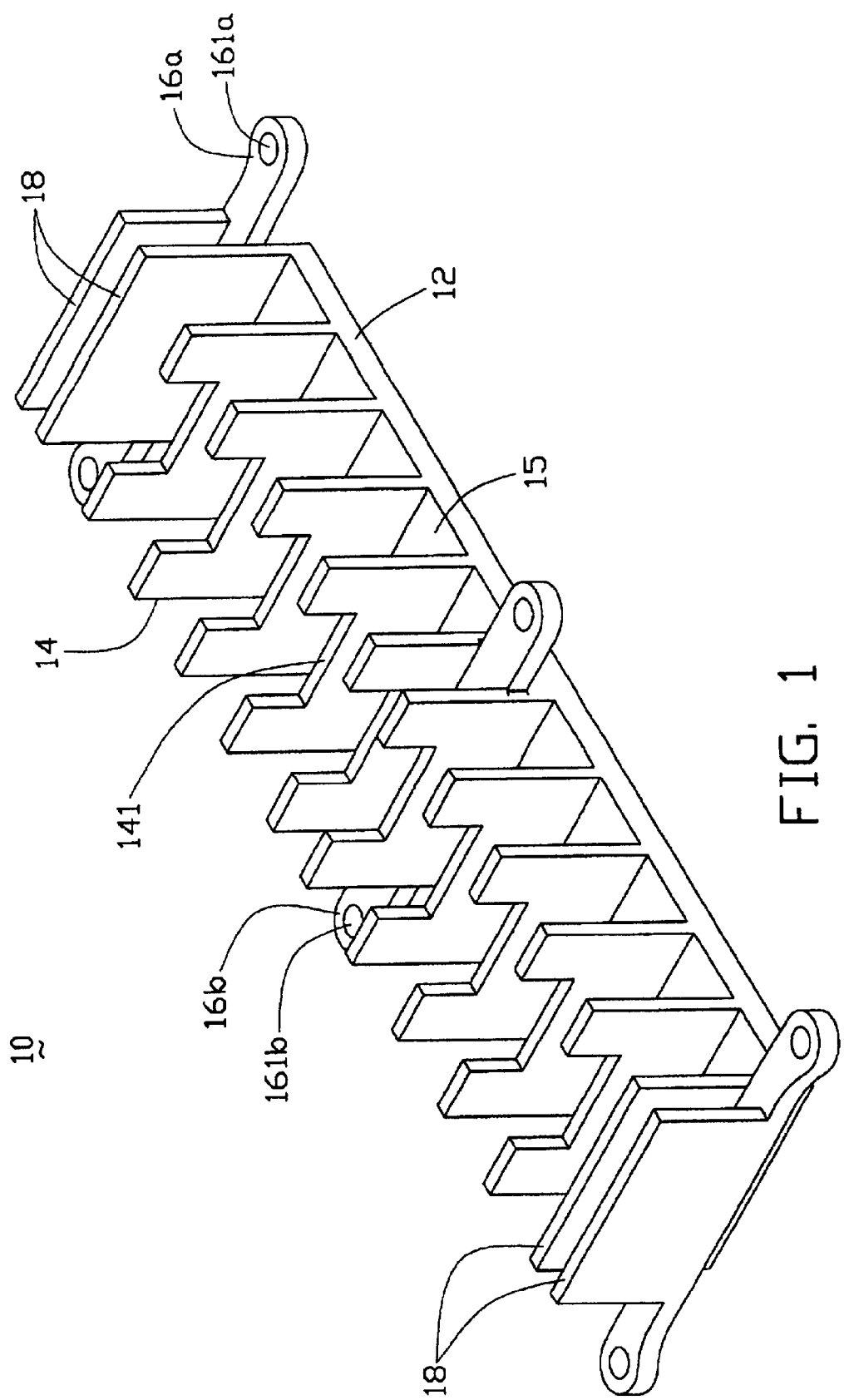
FIG. 1 is a perspective view of a device holder according to the present invention.
Figure 2:
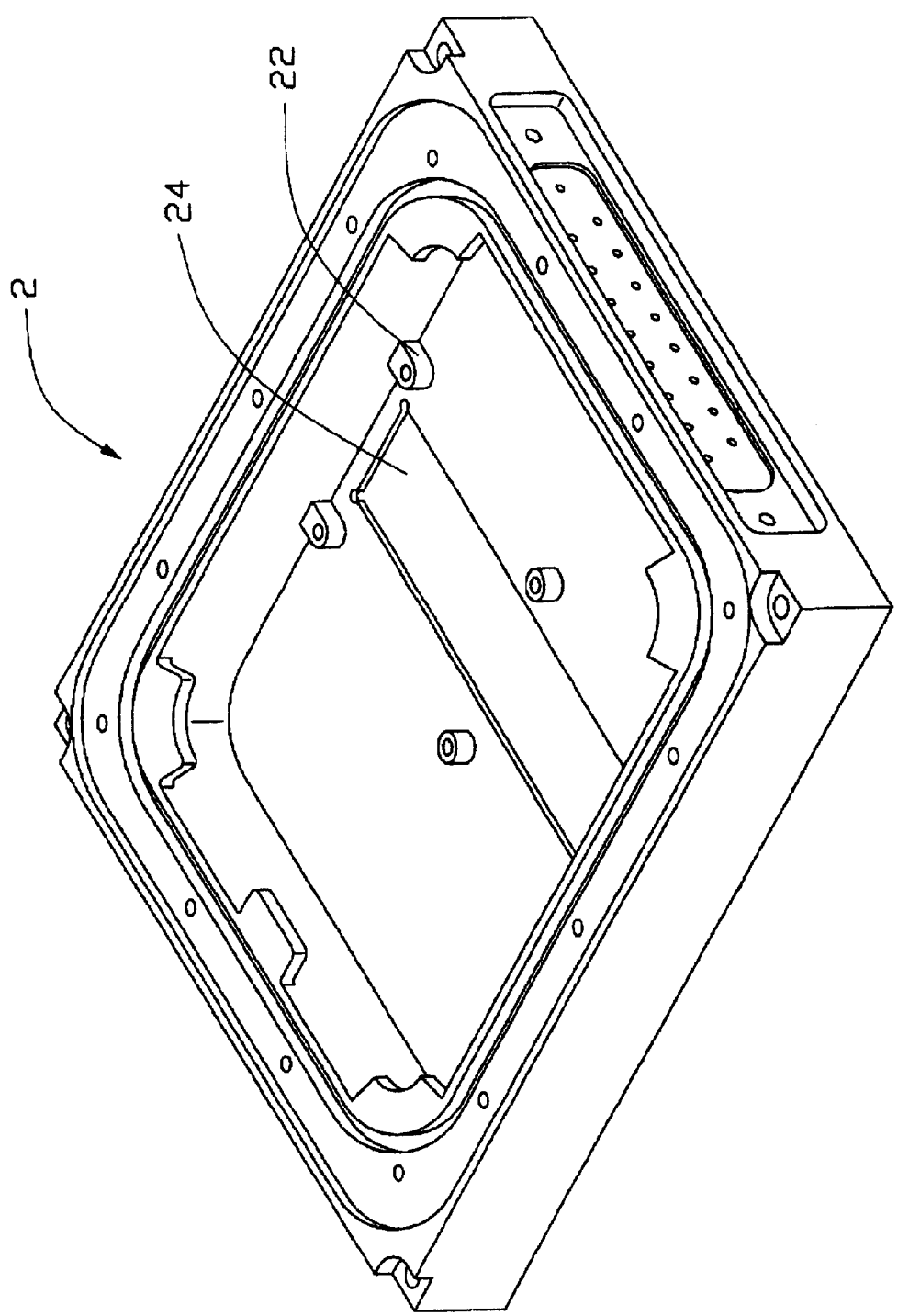
FIG. 2 is a perspective view of an optical module box for receiving the device holder therein.

Referring to FIGS. 1 and 2, a device holder 10 is attached in a box 2 of an optical module by screws. The device holder 10 comprises a substrate 12, a plurality of protrusions 14 extending upwardly from the substrate 12, two side mounting beams 16a respectively formed on the opposite ends of the substrate 12, and a middle mounting beam 16b formed at a middle of the substrate 12. A pair of guarding walls 18 extends from each end of the substrate 12 for providing routing slots for protecting the optical fibers connecting with the WDMs 1 mounted in the device holder. Each WDM 1 is packed in a sleeve (not labeled), and communicates with other optical devices via optical fibers.

The substrate 12 is a rectangular flat plate, a height of the substrate 12 being equal to a depth of a fixing groove 24 defined in a bottom of the optical module box 2. The protrusions 14 extend upwardly from the substrate 12 at a same distance. The protrusions 14 can be of any shape, but those shown as the preferred embodiment of the present invention are rectangular. The substrate 12 and each pair of opposing protrusions 14 form a groove 15 to receive a respective WDM 1 therein. A cutout 141 is defined in an upper portion of each protrusion 14.

The side mounting beams 16a and middle mounting beam 16b extend upwardly from the substrate 12 and are integral with the substrate 12. Each end of each mounting beam 16a and 16b is round. Each end of each side mounting beam 16a has a slight outward bend to accommodate a portion of a fixing block 22 defined in the optical module box 2. The mounting beams 16a and 16b, stably fix the device holder 10 in the optical module box 2 and decrease vibration of WDMs 1 in comparison with mounting the device holder 10 directly to a bottom of the box 2. A mounting hole 161a is defined through each end of the side mounting beam 16a, and a mounting hole 161b is defined through each end of the middle mounting beam 16b. The mounting holes 161a and 161b correspond in position with fixing holes in th fixing blocks 22 of the optical module box 2.

One guarding wall 18 extends upwardly from the mounting beam 16a, and the other extends upward from the substrate 12 and abuts against the side mounting beam 16a. These two guarding walls 18 are parallel to each other and extend to a same height above the substrate 12. The optical fibers (not labeled) connecting with the WDMs 1 are arranged between pairs of guarding walls 18 for protecting the fibers from too sharp curving or bending.

The device holder 10 is injection molded. A thermoplastic material is used to make the device holder 10 to protect the WDM 1 mounted in the device holder 10 from hot or cold temperature at a bottom of the box 2. Preferred conductive thermoplastic composite materials are from the family of STAT-KON Conductive Composites, commercially available from LNP Engineering Plastics, Inc. of Exton, Pa.

Figure 3:
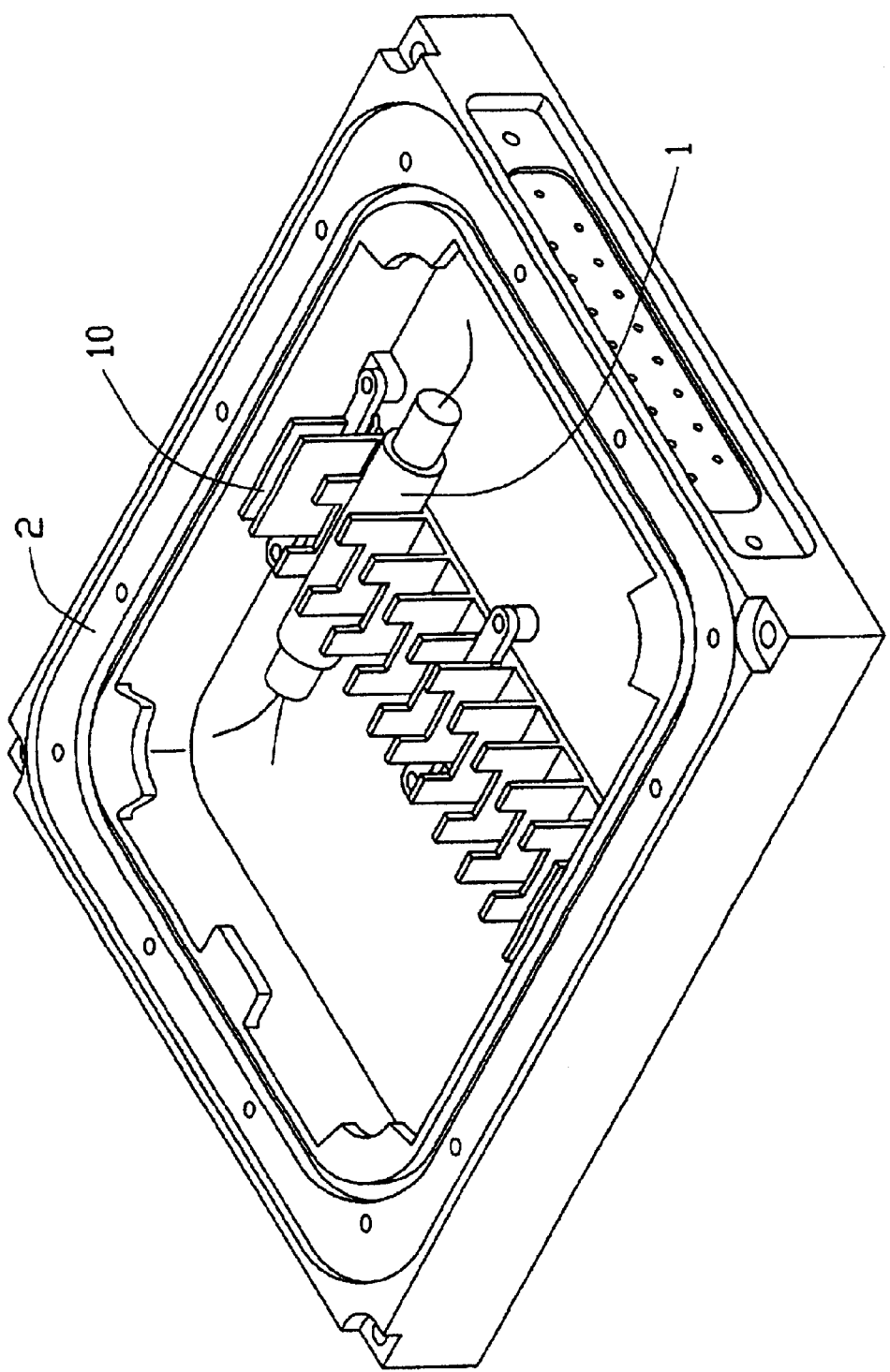
FIG. 3 is a perspective view of the device holder mounted to the optical module box of FIG. 2, together with a WDM secured in the device holder.

Referring to FIG 3, in assembly, the device holder 10 is mounted in the fixing groove 24 at the bottom of the optical module box 2. Each of the mounting beams 16a and 16b overlap corresponding fixing blocks 22 in the bottom of the optical module box 2, and the mounting hole 161a and 161b align with corresponding fixing holes in the fixing blocks 22. The device holder 10 is fixed to the bottom of the optical module box 2 by screws (got shown). Therefore, the device holder 10 is secured to optical module reliably and durably. The WDMs 1 are easily positioned in the corresponding fixing grooves 15, and glue is applied along the cutouts 141 to the device hold 10 so that the glue flows over the WDMs 1 and the WDMs 1 are firmly fixed the fixing grooves 15.

Although the present invention has been described with specific terms, it should be noted that the described embodiments are not necessarily exclusive, and that various changes and modifications may be made thereto without departing from the scope of the present invention as defined in the appended claims.

What is claimed is:

1. A device holder adapted to mount in an optical module box for retaining WDMs therein, comprising:
    a mounting substrate;
    a plurality of protrusions projecting upwardly from the mounting substrate, said protrusions substantially aligning in a longitudinal direction;
    slots defined between pairs of protrusions;
    a cutout defined in an upper portion of each protrusion, said cutouts substantially aligning in the longitudinal direction, and
    a plurality of mounting earns extending from the mounting substrate for screwing the device holder to a bottom of the optical module box.

2. The device holder as described in claim 1, wherein the device holder is injection molded.

3. The device holder as described in claim 1, wherein the device holder is made of an elastic elastic material having a protecting which prevents heat or cold from transferring from the box to the device holder.

4. The device holder as described in claim 1, wherein at least two beams are defined at each of two ends of the substrate.

5. The device holder as described in claim 1, wherein each mounting beam has two opposite ends and each end is round.

6. The device holder as described in claim 1, wherein a plurality of mounting holes is defined through each mounting beam.

7. The device holder as described in claim 1, wherein the slots are each for holding one WDM.

8. The device holder as described in claim 1, wherein the device holder is fixed in the optical module by screws.

9. The device holder as described in claim 1, wherein a pair of guarding walls projects upwardly from the substrate on the mounting beams for protecting optical fibers connected to the WDMs from bending too sharply.

10. An optical assembly comprising:
    a box defining a space therein and comprising a plurality of fixing blocks provided thereon;
    a holder with a low the conductivity thereof mounted on the fixing blocks of the box, said holder including a substrate with a plurality of upstanding protrusions thereon, said substrate secured to and inside the box, said plural upstanding protrusions being parallel and substantially aligning in a longitudinal direction and defining a plurality of fixing grooves between adjacent two protrusions, each protrusion having a cutout defined thereon, said cutouts being parallel and substantially aligning in the longitudinal direction; and
    a plurality of optical devices adhered within the corresponding fixing grooves, respectively; wherein
    said holder not only secures the corresponding optical device in the box but also somewhat isolates heat transfer between the box and the optical devices.

* * * * *